United States Patent [19]
Schmidt et al.

[11] Patent Number: 6,122,575
[45] Date of Patent: Sep. 19, 2000

[54] APU TROUBLESHOOTING SYSTEM

[75] Inventors: Dennis E. Schmidt, San Diego; Michael D. Hanus, Ramona, both of Calif.

[73] Assignee: Hamilton Sundstrand Corporation, Rockford, Ill.

[21] Appl. No.: 09/345,566

[22] Filed: Jun. 30, 1999

[51] Int. Cl.$^7$ .............................. G06F 15/20; F01R 31/00
[52] U.S. Cl. ................. 701/29; 701/29; 701/35; 701/1; 701/30; 707/104; 244/1 R; 324/754; 340/945
[58] Field of Search .................................. 701/29, 35, 1, 701/30; 244/1 R; 707/104; 395/750.08; 324/754; 340/945

[56] References Cited

U.S. PATENT DOCUMENTS

| | | | |
|---|---|---|---|
| 4,788,531 | 11/1988 | Corwin et al. | 340/945 |
| 5,617,039 | 4/1997 | Kuck et al. | 324/771 |
| 5,631,831 | 5/1997 | Bird et al. | 701/29 |
| 5,670,939 | 9/1997 | Rodewald et al. | 340/514 |
| 5,696,676 | 12/1997 | Takaba | 701/31 |
| 5,778,381 | 7/1998 | Sandifer | 707/104 |
| 5,838,261 | 11/1998 | Lauta et al. | 340/945 |
| 5,883,586 | 3/1999 | Tran et al. | 340/945 |
| 5,964,811 | 10/1999 | Ishii et al. | |
| 5,964,813 | 10/1999 | Ishii et al. | 701/35 |
| 6,003,808 | 12/1999 | Nguyen et al. | 244/1 R |
| 6,009,356 | 12/1999 | Monroe | 701/14 |
| 6,014,668 | 1/2000 | Tabata et al. | 707/10 |

OTHER PUBLICATIONS

Presentation at: APS 2000 Operators' Conference, Orlando, Florida, Oct. 1997.
Lavitt, M.O., "Need for Greater Value Drives Innovation", *Aviation Week & Space Technology*, Apr. 20, 1998, pp. 68–69, vol. 148, No. 16.

*Primary Examiner*—William A. Cuchlinski, Jr.
*Assistant Examiner*—Olga Hernandez
*Attorney, Agent, or Firm*—Brown Martin Haller & McClain LLP

[57] ABSTRACT

A system, method, and computer program product assist a technician in troubleshooting an aircraft auxiliary power unit (APU). A portable computer is couplable of download the fault data captured in a memory of the ECU. The fault data corresponds to one or more instances of APU failure. The computer is further programmed to compare the fault data to predetermined fault patterns stored in a database. Each record of the database has one of the fault patterns, a corresponding fault indication, and a corresponding service recommendation indication. The computer is further programmed so that when a record in which the fault pattern matches the fault data is found, the corresponding fault indication and service recommendation are retrieved from the database and provided to the technician via the computer's display or other suitable output mechanism.

29 Claims, 7 Drawing Sheets

| ENG-ID | FADEC NO. | START INDEX | FAULT CODE | WARNING CODE |
|---|---|---|---|---|
| 325 | 100-E | 220 | 000000A0 | 00000000 00040000 |
| 325 | 100-E | 219 | 000000A0 | 00000000 00040000 |
| 325 | 100-E | 209 | 000000A0 | 00000000 00040000 |

FIGURE 4A

| ENG-ID | START INDEX | EGT | % SPEED | $P_{AMB}$ | $T_{AMB}$ | EGT | % SPEED | FUEL | $P_{AMB}$ | $T_{AMB}$ | FAULT CODE |
|---|---|---|---|---|---|---|---|---|---|---|---|
| | | AT START | | | | AT SHUTDOWN | | | | | |
| 325 | 220 | 12 | 0.0 | 12.6 | 12 | 11 | 12.2 | 0 | 12.6 | 12 | 000000A0 |
| 325 | 219 | 13 | 0.0 | 12.6 | 13 | 13 | 13.1 | 0 | 12.6 | 14 | 000000A0 |

FIGURE 4B

| FAULT1 | FAULT2 | FAULT CODE | SHUTDOWN FAULT1 | SHUTDOWN FAULT2 | SHUTDOWN CODE | WARNING | WARNING CODE |
|---|---|---|---|---|---|---|---|
| | | | | | | | |
| | | | | | | | |

| BUILD | ENGINE PARAMS | AT SHUTDOWN | | | | | |
|---|---|---|---|---|---|---|---|
| | | $P_{AMB}$-LL | $P_{AMB}$-UL | $T_{AMB}$-LL | $T_{AMB}$-UL | EGT-LL | EGT-UL |
| | | | | | | | |
| | | | | | | | |

| SPD-LL | SPD-UL | FUEL-LL | FUEL-UL | DELTA (SHUTDOWN - STARTUP) | | | |
|---|---|---|---|---|---|---|---|
| | | | | $P_{AMB}$-LL | $P_{AMB}$-UL | $T_{AMB}$-LL | $T_{AMB}$-UL |
| | | | | | | | |
| | | | | | | | |

APU TROUBLESHOOTING SYSTEM

BACKGROUND OF THE INVENTION

1. Field of the Invention

The present invention relates to aircraft auxiliary power units and diagnostic test equipment for them.

2. Description of the Related Art

An auxiliary power unit (APU) provides electrical and pneumatic power to an aircraft when its main engines are not operational, such as when the aircraft is parked. An APU typically includes a jet turbine engine that drives an electrical generator and other equipment, an electronic control unit (ECU), and cockpit-mounted controls. In APUs manufactured by Hamilton Sundstrand, the ECU is also referred to as a full authority digital electronic control (FADEC).

If an APU fails, an aircraft maintenance technician may be called upon to diagnose and correct the problem. Typically, the ECU measures and captures in a non-volatile memory a limited amount of data relating to various APU operating parameters as they were at the time the APU was started and at the time the APU failed. It may capture such data relating to not one but several recent startups and/or failures, e.g., the 12 most recent failures. From this data, the ECU may provide the technician with some limited diagnostic information. For example, a typical ECU has a one-line alphanumeric display on which it displays a fault code such as "HOT" to indicate a High Oil Temperature condition or "ACCL" to indicate a failure of the APU to accelerate to operating speed upon startup. The ECU may include a simple user interface such as a single button that the technician can press to scroll through the fault codes for recent failures. The ECU may record and indicate more than one fault code relating to a failure. For example, scrolling through the records may indicate both a "HOT" fault code and a "ACCL" fault code associated with the most recent failure.

APU fault codes typically represent only a fraction of the potential faults, and typically do not provide the technician with sufficient information to diagnose the cause of the failure. For example, the fault code "ACFT" may indicate only that the fault relates to the aircraft/APU interface. The intent of the displayed information is only to provide a starting point for diagnosis. Technicians must refer to the APU manufacturer's maintenance manual to determine the significance of the code and the possible causes of the problem. There may, for example, be at least six different reasons why the ECU displays the "ACFT" fault code. The manual may instruct the technician to observe other APU conditions or perform further tests to determine which of these reasons is the applicable one.

Systems have been developed to aid a technician in determining which of the possible reasons for failure is associated with a particular fault code. Such a system may include a laptop computer that the technician can couple to the ECU. The computer downloads from the ECU the fault codes as well as additional diagnostic codes that the ECU stores in association with each failure. These additional codes may indicate the state of various APU subsystems at the time of failure. Nevertheless, the ECU stores these additional codes in binary format only, and does not provide any type of mnemonic translation that would be meaningful to a technician. The primary function of the prior laptop-based systems has been simply to read the internal binary codes, translate them into verbiage, and display them.

Even with the aid of a laptop-based system that displays the internal fault codes in the form of verbiage meaningful to a technician, the task of correctly diagnosing and correcting a problem remains daunting due to a number of complicating factors. One such factor is that, of the internal codes that are displayed, only some of them may actually relate to the cause of the problem, while the others relate to effects of the problem. It is difficult for a technician, even with the aid of a maintenance manual, to determine which of the displayed error codes provide meaningful clues for diagnosing the problem and which do not. Further complicating diagnosis, it may not be evident to the technician which of the different fault codes indicate the more severe problems and, as a result, a technician may spend time needlessly diagnosing less severe problems, which may even be effects rather than the causes of the failure, before more severe problems, which are generally more likely to be the causes of the failure.

The data that the ECU records may include more data than that noted above, including, in certain cases, data relating to engine operating parameters such as speed and temperature. This data has been intended for use only by the APU manufacturer's service personnel and has not been usable by maintenance technicians in the field. The APU manufacturer may on occasion retrieve ECUs from aircraft in the field and, by downloading and analyzing this additional data, assess the manner in which its APUs are being used or investigate engineering design issues.

Prior APU diagnostic systems have not advanced considerably beyond the display of cryptic and imprecise fault codes. It would be desirable to provide a troubleshooting system that not only precisely diagnoses APU faults but also recommends corrective action. These problems and deficiencies are clearly felt in the art and are solved by the present invention in the manner described below.

SUMMARY OF THE INVENTION

The present invention relates to a system, method, and computer program product for assisting a technician in troubleshooting an aircraft auxiliary power unit (APU). A portable computer is couplable to an electronic control unit (ECU) of the APU and programmed to download fault data captured in a memory of the ECU. The fault data corresponds to one or more instances of APU failure. The computer is further programmed to compare the fault data to predetermined fault patterns stored in a database. Each record of the database has one of the fault patterns, a corresponding fault indication, and a corresponding service recommendation indication. The computer is further programmed so that when a record in which the fault pattern matches the fault data is found, the corresponding fault indication and service recommendation are retrieved from the database and provided to the technician via the computer's display or other suitable output mechanism.

In some embodiments of the present invention, the computer may be programmed to determine whether more than one of the fault patterns matches the fault data, and rank their corresponding fault indications and service recommendations in order of likelihood so that a technician can focus upon those that are more likely to be the true cause of the failure.

In embodiments of the invention in which the downloaded fault data correspond to multiple instances of APU failure, the computer may be programmed to distinguish between those fault data that are likely attributable to the cause of the APU failure and those that are likely attributable to the effects of APU failure. Only those that are attributable to the cause are used to search the database, and those that are attributable to effects may be ignored. For example, once an APU has failed and shut down, attempts to restart it may result in the recordation of further fault data that appears to reflect further instances of APU failure. In such a case, the fault data associated with the initial failure and shutdown are most useful for diagnostic purposes; the further fault data associated with the attempts to restart the APU are not as useful.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 1:
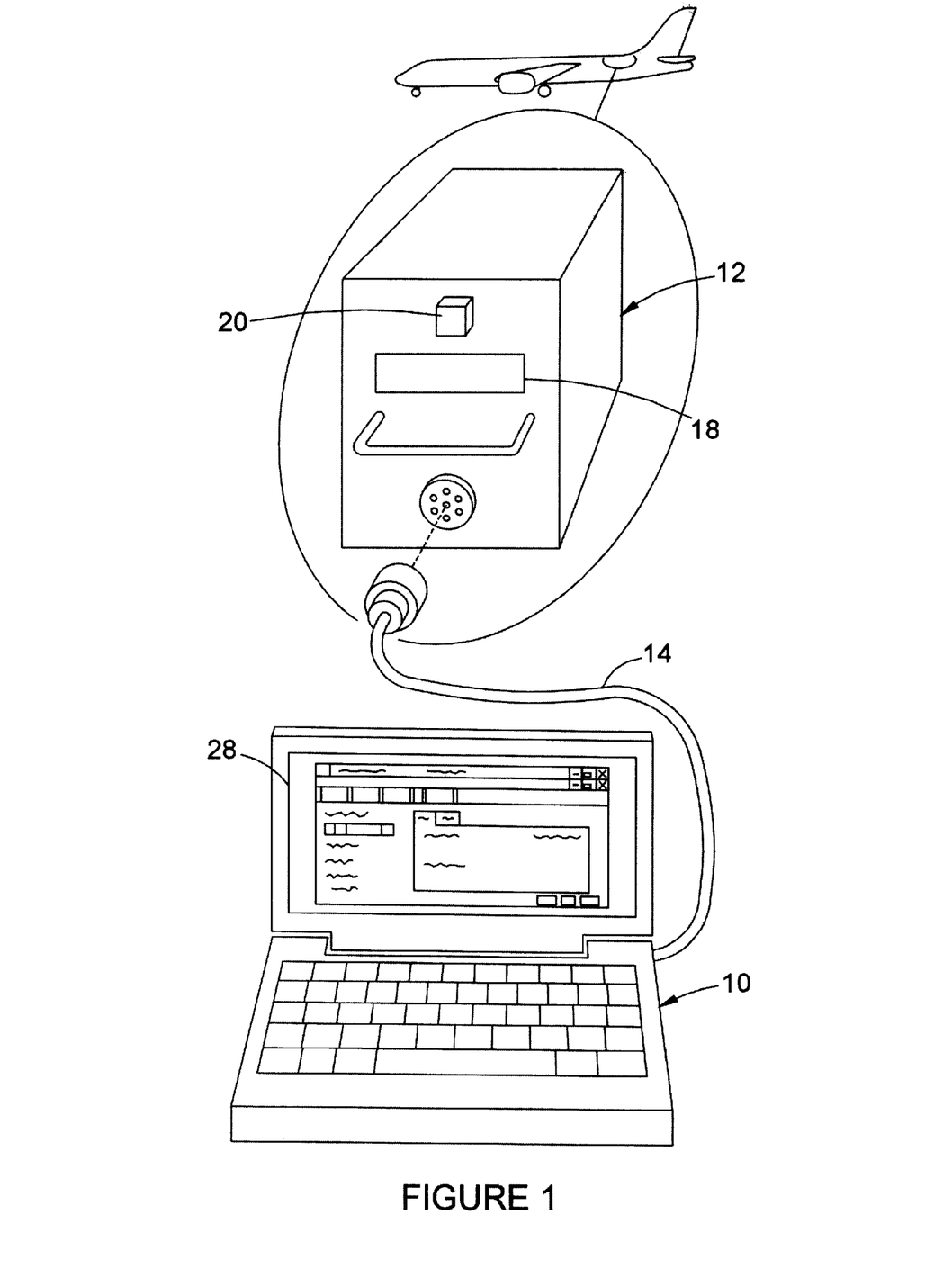
FIG. 1 illustrates a system in which a computer system of the present invention is coupled to an APU electronic control unit.
Figure 4A:
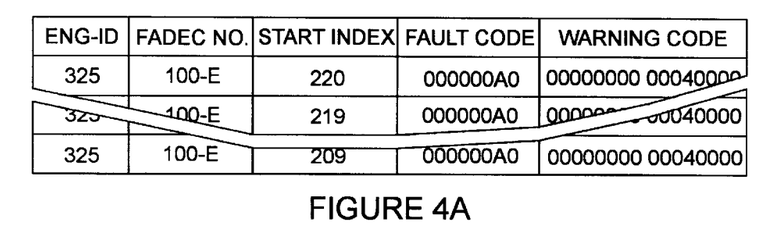
FIG. 4A represents fault data captured in and downloaded from the electronic control unit.
Figure 4B:
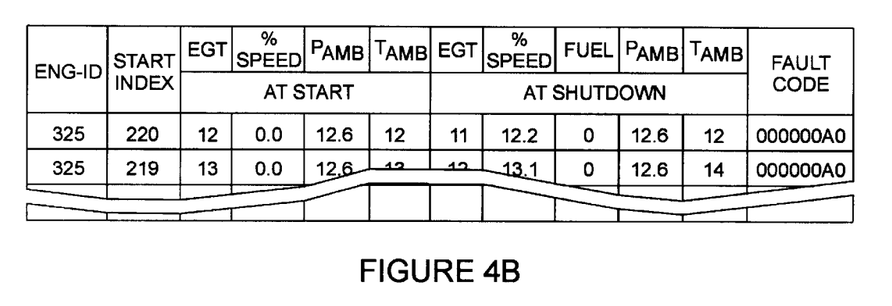
FIG. 4B represents fault data associated with an APU shutdown captured in and downloaded from the electronic control unit.

As illustrated in FIG. 1, a computer 10 is coupled to the electronic control unit (ECU) 12 of an aircraft auxiliary power unit (APU) via a cable 14. ECU 12 is also known as a full authority digital electronic control or FADEC. A service technician couples computer 10 to ECU 12 in this manner after the APU malfunctions and is shut down so that the technician can diagnose and correct the problem. Specifically, the technician couples cable 14 between the serial port of computer 10 and a multi-pin connector 16 of ECU 12. ECU 12 may be, for example, the FADEC of a SUNDSTRAND APS-2000 APU. The operation of ECU 12 is not described in detail in this patent specification because persons skilled in the art to which the invention relates are familiar with the operation of the FADEC of a SUNDSTRAND APS-2000 APU or others like it. Nevertheless, it should at least be noted that ECU 12 includes a display 18 and a button 20 by means of which a technician can review fault codes that ECU 12 captures in a non-volatile memory at the time of an APU failure. Each time the APU is started and thereafter fails, ECU 12 creates a fault record in its non-volatile memory along the lines of those illustrated in FIG. 4A. For each fault record, ECU 12 records information identifying the APU (note column labeled "Engine-ID"), information identifying the FADEC, i.e., a configuration number (note column labeled "FADEC No."), information identifying the record (note column labeled "Start Index"), a fault code (note column labeled "Fault Code"), and a warning code (note column labeled "Warning Code"). In the SUNDSTRAND APS-2000 FADEC, the fault code is four bytes and the warning code is eight bytes. The fault and warning codes represent the status of various APU subsystems, such as a high oil temperature or an air inlet door in the open position. If the APU not only failed but also shut itself down, ECU 12 also creates a record in the corresponding portion of its non-volatile memory representing shutdown data, illustrated in FIG. 4B. Note that because the APU may fail and yet not shut down, there will not necessarily be a shutdown record corresponding to each and every fault record. Each time the APU shuts down as a result of a failure, ECU 12 records, in addition to the "Engine-ID" and "Start Index", a quantity relating to a measurement of the APU exhaust gas temperature at the time the APU was started (note column labeled "EGT"), a quantity representing the percentage of full operating speed the APU at the time the APU was started (note column labeled "%speed"), a quantity relating to a measurement of the ambient air pressure at the time the APU was started (note column labeled "$P_{AMB}$"), a quantity relating to a measurement of the ambient air temperature at the time the APU was started (note column labeled "$T_{AMB}$"), a quantity relating to a measurement of the APU exhaust gas temperature at the time the APU shut down (note second column labeled "EGT"), a quantity representing the percentage of full operating speed the APU at the time the APU shut down (note second column labeled "%speed"), a quantity relating to a measurement of the ambient air pressure at the time the APU shut down (note second column labeled "$P_{AMB}$"), a quantity relating to a measurement of the ambient air temperature at the time the APU shut down (note second column labeled "$T_{AMB}$"), and the "Fault Code."

From the fault code in the fault record relating to the most recent failure, ECU 12 derives mnemonic symbols generally representative of the type of failure and displays the symbols on display 18. For example, the symbol "ACFT: Fire/Door/Battery" is a typical display, indicating to the technician that the fault was an aircraft-type fault and may have involved either a fire, an air inlet or exhaust door, or the battery. By pressing button 20 (FIG. 1), the technician can scroll through similar information on display 18 relating to other fault records corresponding to earlier instances of APU failure. It should be evident that the displayed information does not diagnose the cause of the failure with any degree of precision. At that point, the technician typically consults the aircraft manufacturer's maintenance manual, using the displayed information as a starting point to begin diagnosing the problem and determining how to correct it. The present invention is intended to address this problem by not only significantly improving diagnostic precision but also providing a recommended action to correct the problem.

Figure 2:
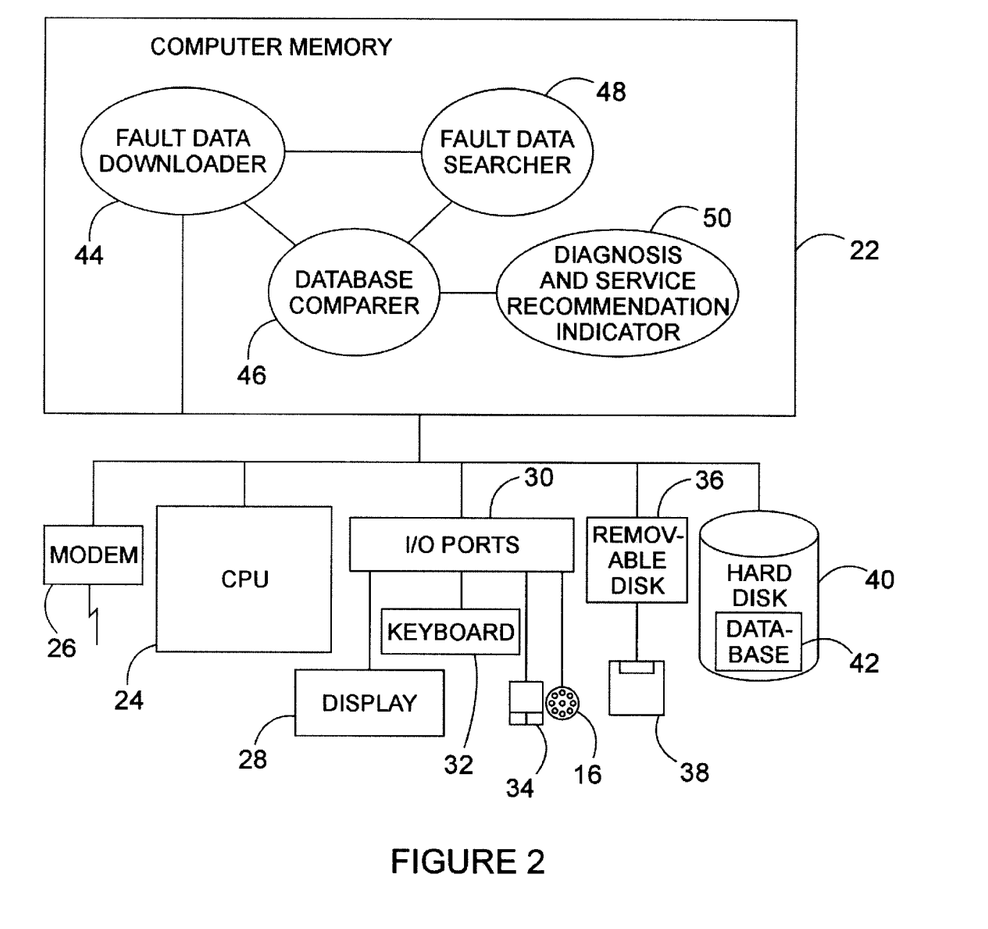
FIG. 2 is a block diagram of the computer system.

Computer 10 is preferably a laptop, palmtop or similar highly portable computer having a MICROSOFT WINDOWS or similar operating system. As illustrated in FIG. 2, computer 10 includes a main memory 22, a central processing unit 24, a modem 26, a display 28, serial and parallel input/output ports 30, a keyboard 32, a mouse 34 or similar pointing device, a removable-disk drive 36 such as a CD-ROM, DVD, floppy disk or other drive based upon magnetic, optical or similar removable data storage medium 38. Computer 10 further includes a hard disk drive 40. A database 42, described in further detail below, is stored on hard disk drive 40 during operation of the present invention. Although a number of commercially available database products may be suitable, an exemplary embodiment of the invention included a MICROSOFT EXCEL database. Database 42 and the other operating software of the present invention may be imported into computer 10 by reading it from data storage medium 38 or by downloading it from a remote server (not shown) using modem 26. The software includes a fault data downloader 44, a database comparer 46, a fault data searcher 48 and a diagnosis and service recommendation indicator 50. As persons of skill in the art understand, although these software elements are illustrated in FIG. 2 as existing simultaneously in memory 22 for purposes of explanatory clarity, they may in actuality be retrieved into memory 22 from hard disk 40 or other source in such segments and at such times as the operating system may cause to occur in accordance with well-known operating system principles. Along similar lines, there are other software elements that are not illustrated in FIG. 2 for purposes of explanatory clarity, such as elements of the operating system, that may exist in memory 22 as well.

Figure 3:
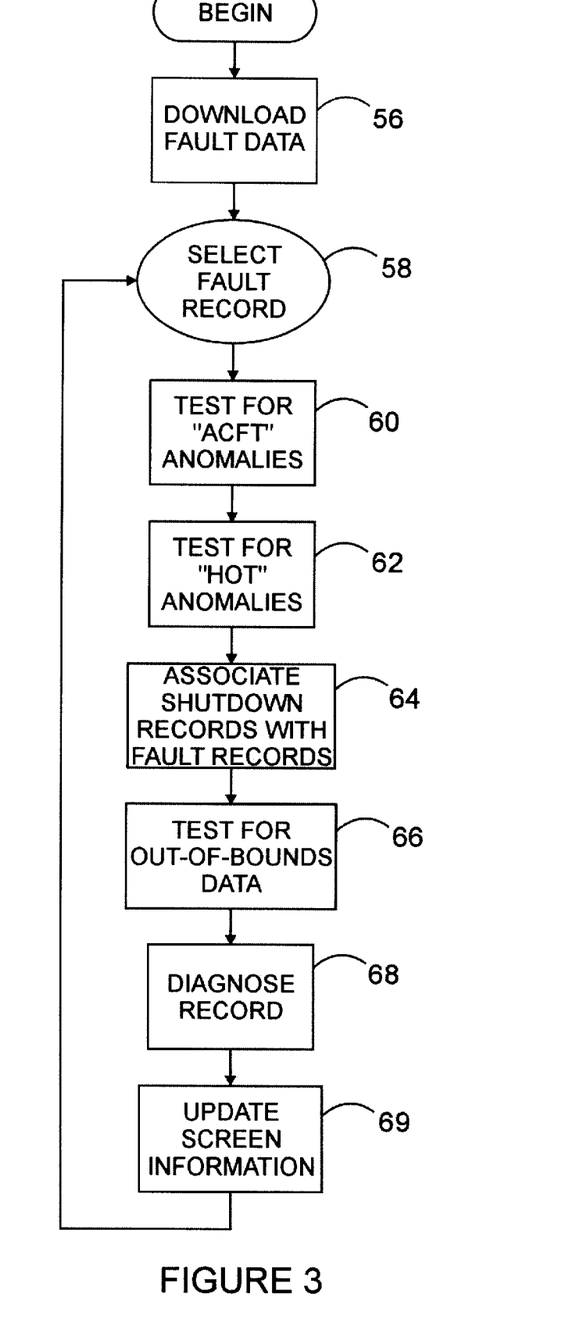
FIG. 3 is a flowchart illustrating the method.

To use the invention, after connecting computer 10 to ECU 12 as described above, the technician turns on computer 10 in the conventional manner. A suitable batch file or similar mechanism (not shown) automatically initiates execution of the software of the present invention. The flowchart of FIG. 3 illustrates the operation of computer 10 as programmed in accordance with the software. Persons skilled in the art will readily be capable of devising suitable software code to effect the methods represented by the flowchart of FIG. 3 in view of the description in this patent specification. Although one may write such software code in any number of suitable computer programming languages, some exemplary software was written in the VISUAL BASIC language.

Figure 7:
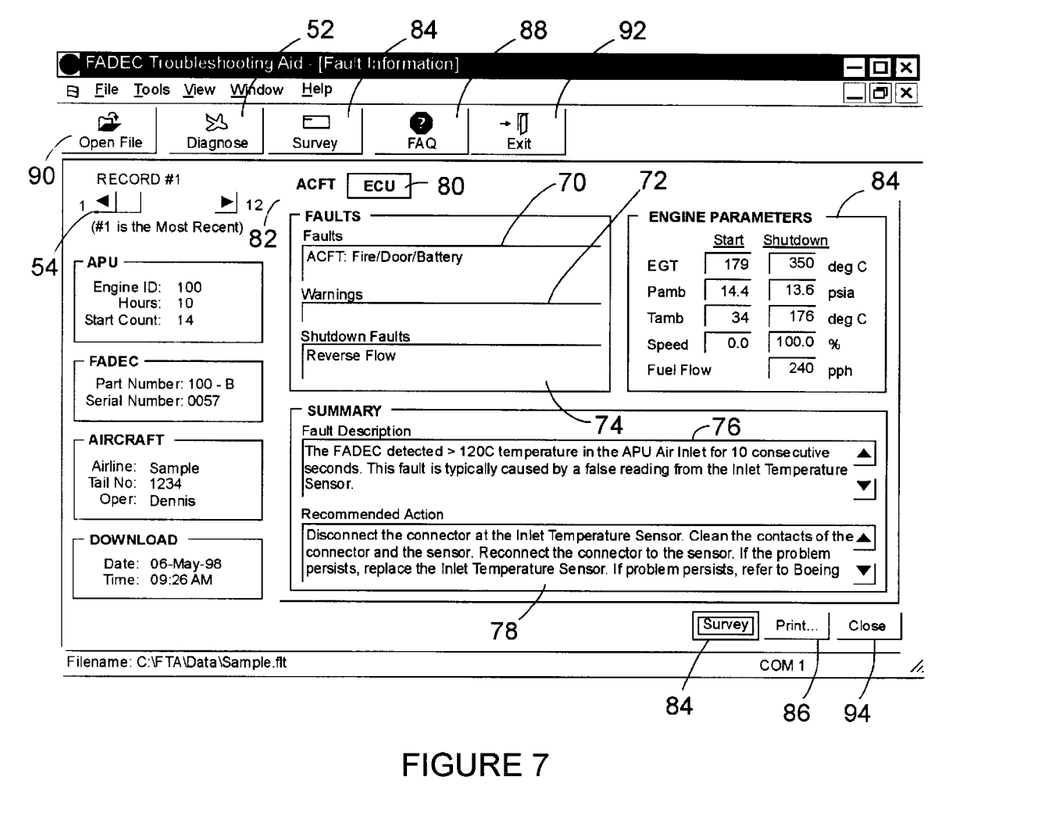
FIG. 7 illustrates a screen display on the computer system.

Computer 10 may first display some initialization screens (not shown), in which the technician is instructed to enter identifying information for the APU, the airline and the aircraft tail number in which the APU is installed. The technician enters data and navigates through the screens using standard windowing user interface conventions, such as activating mouse 34 to select a button or other graphical windowing structure. For example, the user may select or "click on" a Diagnose button 52 to process the most recent fault record. In response, computer 10 downloads the most recent data from the APU and displays information pertinent to the first or more recent fault record ("Record #1"). Computer 10 then displays a screen such as illustrated in FIG. 7. A scroll bar 54 allows the technician to initiate processing of previous fault records.

As illustrated in FIG. 3, at step 56 computer 10 downloads from the non-volatile memory of ECU 12 the fault data described above with regard to FIGS. 4A and 4B. At step 58 the technician selects a fault record. (As noted above, the first fault record is processed first by default, but the technician can scroll through other fault records.) At step 60 computer 10 tests for aircraft-type ("ACFT") anomalies. This step reflects the critical realization that determining the cause of an "ACFT" fault indication may require analysis of the historical fault data, i.e., the fault records corresponding to previous instances of APU failure. Computer 10 first determines whether there is a shutdown record (see, e.g., FIG. 4B) that has a Start Index, Engine-ID and Fault Code that are the same as those of the fault record (see, e.g., FIG. 4A) because there are cases in which diagnosis requires a comparison between the fault code in a fault record and the fault code in the corresponding shutdown records. For example, if the bit representing the "ACFT" fault is not set in the fault record but the bit representing the "ACFT" fault is set in the corresponding shutdown record, then a probable cause of the APU failure is that the air inlet door did not open properly. In this case, it is necessary to determine which of the shutdown records corresponds to the selected fault record. Note that there may be multiple shutdown records that superficially appear to be the same, i.e., same "Engine-ID" and same "Start Index," if for example, a pilot attempted to restart an APU that had shut down and could not be restarted, because ECU 12 only generates a new "Start Index" if the APU is successfully started. Thus, an important part of step 60 is comparing bits of the fault code of the fault record to bits of the fault code of the shutdown records to determine which, if any, of the shutdown records corresponds to, i.e., was created in response to the same instance of APU failure as, the selected fault record.

At step 62 computer 10 tests for high oil temperature ("HOT") anomalies. This step reflects a similar critical realization that determining the cause of an "HOT" fault indication may require analysis of the historical fault data. If the "HOT" fault code bit is set, then it is the next oldest shutdown record that corresponds to the selected fault record if the next oldest shutdown record has a different Start Index than the fault record. If the "HOT" fault code bit is set, and the Start Index of the next oldest shutdown record is the same as that of the selected fault record, and the "HOT" fault code bit of the next oldest shutdown record is not set, then the original or previous shutdown record corresponds to the selected fault record. If the "HOT" fault code bit is set, and the Start Index of the next oldest shutdown record is the same as that of the selected fault record, and the "HOT" fault code bit of the next oldest shutdown record is set, then it can be inferred that the APU did not shut down as a result of the instance of APU failure represented by the selected fault record, and no shutdown record corresponds to the selected fault record.

At step 64 computer 10 associates the remaining shutdown records with the other (non-selected) fault records. In this case, a shutdown record can be deemed to correspond to a fault record if their Engine-ID and Start Index match.

At step 66 computer 10 tests the fault record data and shutdown record data for values that are out of reasonable bounds. If values are out of reasonable bounds, then it can be inferred that the measurement was incorrect. Computer 10 does not attempt to diagnose a failure if the recorded data is not trustworthy and provides a suitable indication. If all data are within reasonable bounds, computer 10 proceeds to step 68.

Figure 5A:
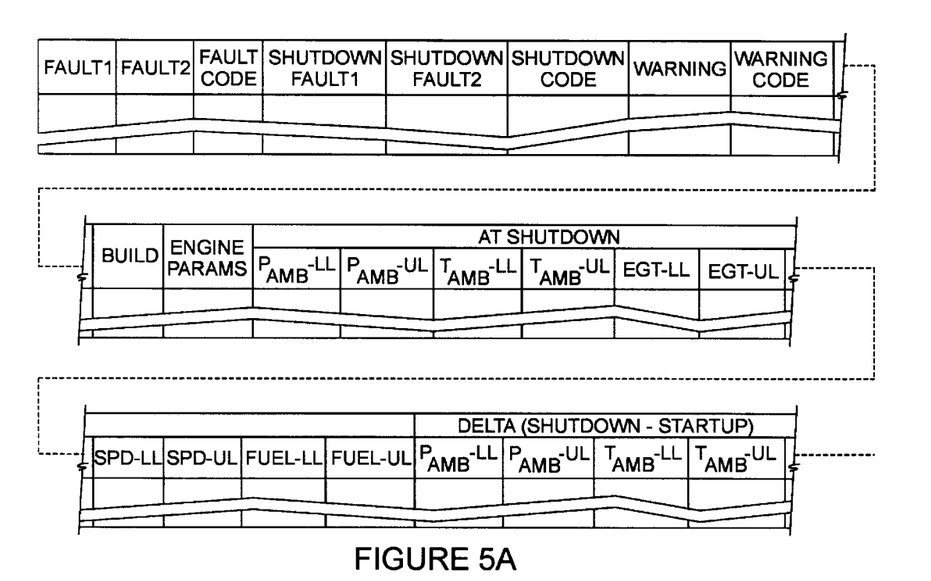
FIG. 5A represents a database table having records that relate to fault data.
Figure 5B:
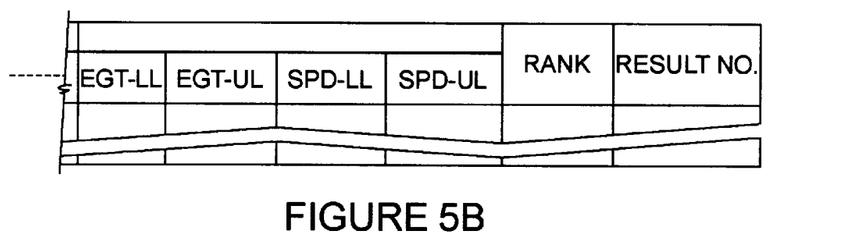
FIG. 5B is a continuation of FIG. 4A.

At step 68 computer 10 diagnoses the selected record by comparing the fault record data and corresponding shutdown record data to the data stored in database 42, represented by FIGS. 5A–5B. As in any database, the rows may be considered to be records, and the data in each column may be associated or included within any of the records.

The columns include a first fault indication ("Fault1") and a second fault indication ("Fault2"). More than one fault code may be associated with an instance of APU failure. The inclusion of these columns reflects the critical realization that certain faults that occur together are indicative of a problem that may not be the same as the problem of which only one of the codes occurring by itself or in combination with still another code would be indicative. The data in these columns are the mnemonic symbols that corresponds to the fault code, such as "ACFT." As noted above, a number of possible faults may be grouped under a single mnemonic symbol, and can only be differentiated from one another by a more complete analysis of the fault code bits. The binary fault code itself is included in a "Fault Code" column. These data are compared to that of the downloaded fault code data of the selected fault record.

The columns also include "Shutdown Fault1" "Shutdown Fault2," and "Shutdown Code" columns. The data in the these columns are the mnemonic symbols and corresponding binary fault codes for shutdown conditions and are compared to the downloaded data of the corresponding shutdown record. A "Warning" column and "Warning Code" column store the mnemonic symbol and corresponding binary warning code and are compared to the downloaded warning code data of the selected fault record.

Another column is the "Build" column, which represents the version or build of the FADEC that identifies it. The engineering designs of FADECs occasionally are changed resulting in different versions of a particular FADEC. In addition, it is foreseeable that FADECs implemented for a particular APU may be designed by different manufacturers. These different designs and versions may affect the diagnosis, and consequently, the comparison of the data in this column to the identifying information read by the computer 10 may effect the diagnostic process.

In certain instances, the diagnosis depends upon analysis of the portion of the downloaded fault codes that represent APU engine operating parameters. If the record reflects an analysis of engine parameters, an "Engine Parameters" column is marked. The next group of 18 columns are the values of the engine parameters. Half of these columns store parameters relating to the time of APU shutdown, and the other half store parameters representing the delta or difference between the values of those parameters at APU startup and at APU shutdown. For each parameter, a column is included for a lower limit and a column is included for an upper limit. The columns for both shutdown values and delta values are: ambient pressure, lower limit ("$P_{AMB}$-LL"); ambient pressure, upper limit ("$P_{AMB}$-UL"); ambient temperature, lower limit ("$T_{AMB}$-LL"); ambient temperature, upper limit ("$T_{AMB}$-UL"); exhaust gas temperature, lower limit ("EGT-LL"); exhaust gas temperature, upper limit ("EGT-UL"); percentage of normal engine operating speed, lower limit ("SPD-LL"); percentage of normal engine operating speed, upper limit ("SPD-UL"); fuel, lower limit ("FUEL-LL") and fuel, upper limit ("FUEL-UL"). Downloaded engine parameter data are deemed to match the values in the database table if they are between the upper and lower limits of that parameter. As described above, the downloaded fault data and shutdown data are compared to the values in these columns to determine whether they match. If all columns of a record match the downloaded data, that record is deemed to represent a problem that is likely the cause (or one of the causes) of the APU failure. Note that it is possible that the columns of more than one record may match the downloaded data.

The remaining columns include a "Rank" column and a "Result No." column. The Rank of a record is a value representing an estimate of the relative likelihood that the problem or diagnosis represented by that record is the true cause of the APU failure in comparison with other records that may have the same or similar values. Because the comparison may result in two or more matching records (diagnoses), the Rank is used to sort the diagnoses for presentation to the technician in order of likelihood, with the most likely diagnosis presented first. The Result No. is used as an index into the database table illustrated in FIG. 6. This table includes a "Result No." column, a "Fault Description" column, a "Notes" column, and a "Recommended Action" column. This table is separate from that of FIG. 5 for purposes of convenience, but in other embodiments the tables may be combined or partitioned in any other suitable manner.

Figure 6:
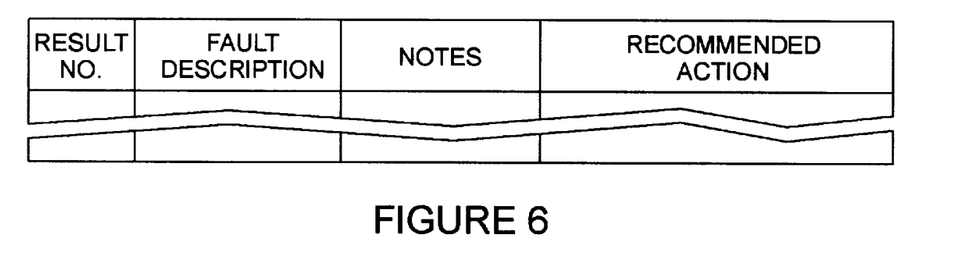
FIG. 6 represents another database table having records that relate to fault description indications and corresponding service recommended action indications.
Figure 8:
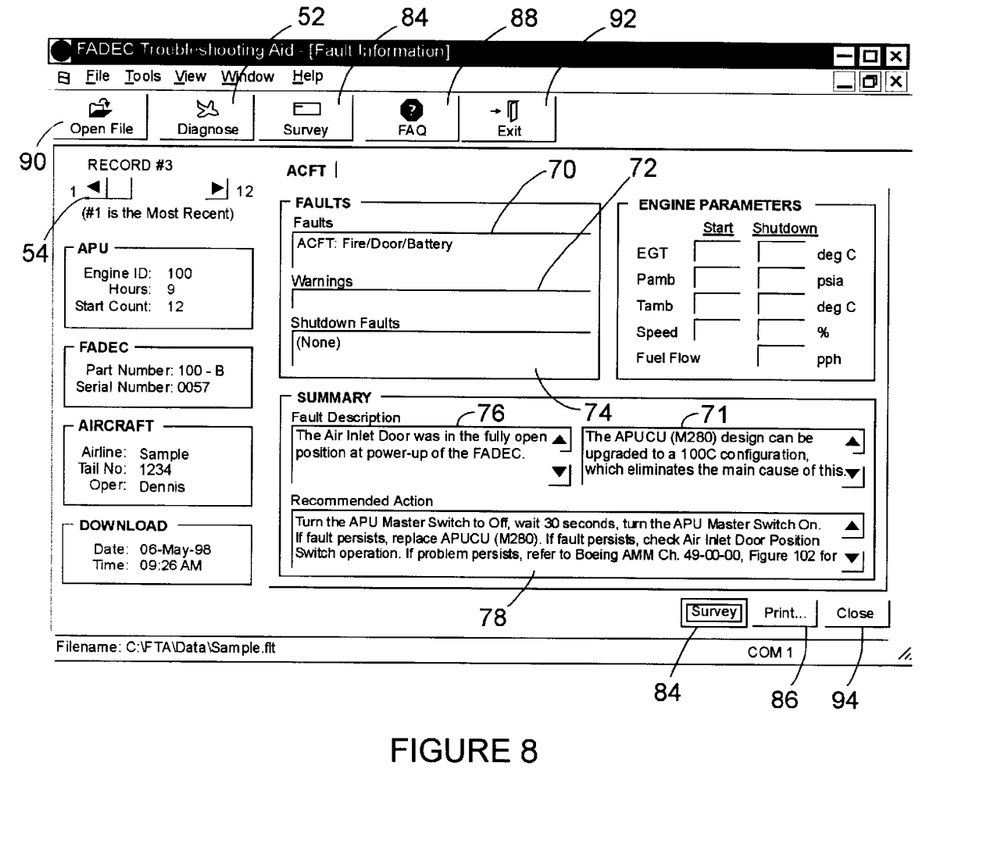
FIG. 8 illustrates another screen display on the computer system.

When the comparison results in a matching record, at step 69 an English description of the Fault code of the indexed record of the table of FIGS. 5A–B are displayed in the "Faults" box 70 on the computer screen, as illustrated in FIGS. 7 and 8. Similarly, the Notes data, if any, of the indexed record of the table of FIG. 6 are displayed in a "Notes" box 71 (FIG. 8), an English description of the Warnings code of the indexed record of the table of FIGS. 5A–B are displayed in the "Warnings" box 72, the Shutdown Fault1 and/or Shutdown Fault2 data of the indexed record of the table of FIGS. 5A–B are displayed in the "Shutdown Faults" box 74, the Fault Description data of the indexed record of the table of FIG. 6 are displayed in the "Fault Description" box 76, and the Recommended Action data of the indexed record of the table of FIG. 6 are displayed in the "Recommended Action" box 78.

If the comparison resulted in more than one matching record, the data of the most likely record, i.e., the one having the highest Rank, are displayed first, and the data of the next most likely record are displayed by means of a similar screen display that the technician can activate by clicking on a second tab 80. To return to the display corresponding to the most likely record, the technician can click on the first tab 82. For example, first tab 82 may be labeled "ACFT" to indicate that the most likely cause of the APU failure was of the aircraft type, and second tab 80 may be labeled "ECU" to indicate that the next most likely cause of the APU failure was of the ECU type. If the Engine Parameters column of the matching record is marked, the downloaded engine parameter data are displayed in an "Engine Parameter" box 84.

In an exemplary embodiment of the invention, multiple fault codes are grouped together in accordance with the relationships between the faults. For example, a shutdown fault is paired with the non-shutdown fault if it is likely that the non-shutdown fault caused the shutdown fault. If multiple non-shutdown faults may have caused the shutdown fault, the faults are paired in accordance with the most likely cause-effect relationship. Although the computer 10 ranks the various combinations of faults, the information displayed to the technician reflects the ranking by displaying the most likely pair of faults as the failure and the corrective action necessary. Since all the faults have actually occurred, all faults are displayed, as described below in reference to step 58, so that the technician may address each fault.

In other embodiments of the invention, the failures or faults may be grouped or ranked in other ways. For example, if the likelihood of several events (failures) resulting in a chain reaction of fault codes is greater than other grouping such as pairing of faults, the highest ranked fault will be in accordance with the grouping of those several fault codes generated by the several events.

If the technician uses scroll bar 54 to select the next downloaded fault record (or any other downloaded fault record), computer 10 returns to step 58 and performs the comparison and tests described above with respect to steps 60–69. As noted above, ECU 12 typically stores 12 fault records that correspond to the 12 most recent APU runs.

The user interface further includes "Survey" buttons 84 that a technician can click on to initiate communication with remote personnel or a computer server via modem 26. For example, the downloaded fault data can be transmitted for off-site analysis by the APU manufacturer's personnel through a computer. Clicking on a "Print" button 86 initiates printing of the data and results if a printer is attached to computer 10. Clicking on a "FAQ" button 88 causes a list of frequently asked questions and their answers to be displayed. The display includes "Open File", "Exit", and "Close" buttons 90, 92 and 94, respectively, that are used in the manner conventional to WINDOWS-based application programs.

A comparison of FIG. 7 with FIG. 8 illustrates that APU failures can result in the same fault indication (in this example, "ACFT: Fire/Door/Battery") but be attributable to very different problems. In the case of the failure to which FIG. 7 relates, the system diagnosed the problem an over-temperature condition in the APU air inlet, and recommended cleaning the contacts of the Inlet Temperature Sensor. In the case of the failure to which FIG. 8 relates, the system diagnoses the problem as the air inlet door being left in the fully open position at power-up of the FADEC, and recommended cycling the APU master power switch off and on, among other actions. Note that in contrast to this relatively precise diagnosis and recommended actions, prior systems provided the technician with only the "ACFT" mnemonic code (as displayed on display 18 of ECU 12) or, at most, with a translation of the fault code into a text string such as "Fire/Door/Battery" and the shutdown code into a text string such as "Reverse Flow." The present invention provides a complete Fault Description and a complete Recommended Action in language that is meaningful to a technician.

In addition, the data obtained by the computer 10 is stored and can be used in a variety of ways by the technician or others to more efficiently diagnose, repair and maintain the APU. Diagnostic experts can access the stored data to statistically monitor the various failures, the suggested actions of the program and the repair action that actually fixed the problems. The accuracy of the diagnostic program can be continually improved using the comments submitted by the technician in the survey coupled to the data obtained during the various runs. Another example of using the data for efficient maintenance of the APU includes periodically performing the diagnostic testing on each aircraft to determine the quantity of each type of repair part that should be ordered.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A method of diagnosing a failure of an aircraft auxiliary power unit comprising the steps of:

downloading fault data from a memory of an electronic control unit of the auxiliary power unit to a computer;

comparing the fault data to a plurality of fault patterns accessible to the computer to determine a likelihood of the cause of the failure; and producing an output in accordance with the likelihood of the cause of the failure.

2. A method in accordance with claim 1 further comprising the steps of:

ranking a plurality of possible combinations of faults of the fault data in accordance with the likelihood of the occurrence of the possible combinations of faults to produce a rank; and producing the output in accordance with the possible combinations and the rank.

3. A method in accordance with claim 2, wherein the step of ranking comprises the steps of:

pairing the faults to produce a plurality of combination pairs; and comparing each of the plurality of combination pairs to the fault patterns to determine a likely cause and effect relationship.

4. A method for assisting a technician in troubleshooting an aircraft auxiliary power unit (APU), comprising the steps of:

said technician coupling a portable computer to an electronic control unit (ECU) of the APU;

said computer downloading fault data captured in a memory of said ECU, said fault data corresponding to an instance of APU failure;

said computer comparing said fault data to predetermined fault patterns stored in a database in said computer, said database defined by a plurality of records, each record having one of said fault patterns, a corresponding fault indication, and a corresponding service recommendation indication; and said computer providing to said technician a fault indication and a service recommendation indication corresponding to one of said fault patterns matching said fault data.

5. The method claimed in claim 4, further comprising the steps of:

said computer searching said fault data to determine historical fault data corresponding to a plurality of sequential instances of APU failures;

said computer evaluating said historical fault data in accordance with a predetermined algorithm to determine fault data caused by said instance of APU failure and fault data that are the effect of said instance of APU failure; and wherein said step of said computer providing to said technician a fault indication and a service recommendation indication comprises providing a fault indication and a service recommendation indication corresponding to one of said fault patterns matching said fault data determined to be caused by said instance of APU failure.

6. The method claimed in claim 5, wherein said fault patterns include engine operating parameter data.

7. The method claimed in claim 6, wherein said engine operating parameter data is selected from the group consisting of engine speed, exhaust gas temperature, ambient temperature and ambient pressure.

8. The method claimed in claim 4, wherein said fault patterns include engine operating parameter data.

9. The method claimed in claim 8, wherein said engine operating parameter data is selected from the group consisting of engine speed, exhaust gas temperature, ambient temperature and ambient pressure.

10. The method claimed in claim 4, further comprising the steps of:

said computer determining whether more than one of said fault patterns matches said fault data; and if more than one of said fault patterns matches said fault data, said computer providing to said technician in order of likelihood a plurality of fault indications and service recommendations indications corresponding to said fault patterns matching said data.

11. The method claimed in claim 10, wherein each record in said database has a likelihood estimation rank, and said step of said computer providing to said technician in order of likelihood a plurality of fault indications and service recommendations indications corresponding to said fault patterns matching said data is performed in response to said likelihood estimation rank.

12. A method in accordance with claim 11 further comprising the step of determining the likelihood estimation rank based on grouping of faults.

13. A method in accordance with claim 12 wherein the grouping of faults is based on the likelihood of a fault being caused by a second fault.

14. A system for assisting a technician in troubleshooting an aircraft auxiliary power unit (APU), comprising:
a portable computer couplable to an electronic control unit (ECU) of the APU and programmed to include downloading means, comparing means and indicating means;
said downloading means for downloading fault data captured in a memory of said ECU, said fault data corresponding to an instance of APU failure;
said comparing means for comparing said fault data to predetermined fault patterns stored in a database in said computer, said database defined by a plurality of records, each record having one of said fault patterns, a corresponding fault indication, and a corresponding service recommendation indication; and
said indicating means for providing to said technician a fault indication and a service recommendation indication corresponding to one of said fault patterns matching said fault data.

15. The system claimed in claim 14, wherein said fault patterns include engine operating parameter data.

16. The system claimed in claim 15, wherein said engine operating parameter data is selected from the group consisting of engine speed, exhaust gas temperature, ambient temperature and ambient pressure.

17. The system claimed in claim 14, wherein said computer is programmed to further comprise:
multiple fault means for determining whether more than one of said fault patterns matches said fault data; and
said indicating means provides to said technician in order of likelihood a plurality of fault indications and service recommendations indications corresponding to said fault patterns matching said data if more than one of said fault patterns matches said fault data.

18. The system claimed in claim 17, wherein each record in said database has a likelihood estimation rank, and said indicating means provides said plurality of fault indications and service recommendations indications corresponding to said fault patterns matching said data in response to said likelihood estimation rank.

19. The system claimed in claim 14, wherein said computer is programmed to further comprise:
historical searching means for searching said fault data to determine historical fault data corresponding to a plurality of sequential instances of APU failures;
historical evaluation means for evaluating said historical fault data in accordance with a predetermined algorithm to determine fault data caused by said instance of APU failure and fault data that are the effect of said instance of APU failure; and
wherein said indicating means provides a fault indication and a service recommendation indication corresponding to one of said fault patterns matching said fault data determined to be caused by said instance of APU failure.

20. The system claimed in claim 19, wherein said fault patterns include engine operating parameter data.

21. The system claimed in claim 20, wherein said engine operating parameter data is selected from the group consisting of engine speed, exhaust gas temperature, ambient temperature and ambient pressure.

22. A computer program product for assisting a technician in troubleshooting an aircraft auxiliary power unit (APU), said computer program product comprising:
a computer-readable medium carrying thereon:
downloading means for downloading fault data captured in a memory of said ECU, said fault data corresponding to an instance of APU failure;
comparing means for comparing said fault data to predetermined fault patterns stored in a database in said computer, said database defined by a plurality of records, each record having one of said fault patterns, a corresponding fault indication, and a corresponding service recommendation indication; and
indicating means for providing to said technician a fault indication and a service recommendation indication corresponding to one of said fault patterns matching said fault data.

23. The system claimed in claim 22, wherein said fault patterns include engine operating parameter data.

24. The system claimed in claim 23, wherein said engine operating parameter data is selected from the group consisting of engine speed, exhaust gas temperature, ambient temperature and ambient pressure.

25. The system claimed in claim 22, wherein said computer is programmed to further comprise:
multiple fault means for determining whether more than one of said fault patterns matches said fault data; and
said indicating means provides to said technician in order of likelihood a plurality of fault indications and service recommendations indications corresponding to said fault patterns matching said data if more than one of said fault patterns matches said fault data.

26. The system claimed in claim 25, wherein each record in said database has a likelihood estimation rank, and said indicating means provides said plurality of fault indications and service recommendations indications corresponding to said fault patterns matching said data in response to said likelihood estimation rank.

27. The system claimed in claim 22, wherein said computer is programmed to further comprise:
historical searching means for searching said fault data to determine historical fault data corresponding to a plurality of sequential instances of APU failures;
historical evaluation means for evaluating said historical fault data in accordance with a predetermined algorithm to determine fault data caused by said instance of APU failure and fault data that are the effect of said instance of APU failure; and
wherein said indicating means provides a fault indication and a service recommendation indication corresponding to one of said fault patterns matching said fault data determined to be caused by said instance of APU failure.

28. The system claimed in claim 27, wherein said fault patterns include engine operating parameter data.

29. The system claimed in claim 28, wherein said engine operating parameter data is selected from the group consisting of engine speed, exhaust gas temperature, ambient temperature and ambient pressure.

* * * * *